United States Patent [19]

Lin et al.

[11] Patent Number: 5,729,663
[45] Date of Patent: Mar. 17, 1998

[54] METHOD AND APPARATUS FOR GRAY SCREENING

[75] Inventors: Ying-wei Lin, Penfield; Leon C. Williams, Walworth, both of N.Y.

[73] Assignee: Xerox Corporation, Stamford, Conn.

[21] Appl. No.: 569,036

[22] Filed: Dec. 7, 1995

[51] Int. Cl.$^6$ .................................................. H04N 1/40
[52] U.S. Cl. .......................... 395/109; 358/456; 358/465
[58] Field of Search ................................. 358/456, 466, 358/465, 460, 457, 459, 534–536, 455; 382/270; 395/106, 109, 117, 162, 164

[56] References Cited

U.S. PATENT DOCUMENTS

| | | | |
|---|---|---|---|
| 4,544,264 | 10/1985 | Bassetti et al. | 355/208 |
| 4,625,222 | 11/1986 | Bassetti et al. | 358/300 |
| 4,860,026 | 8/1989 | Matsumoto et al. | 358/298 |
| 5,077,615 | 12/1991 | Tsuji | 358/298 |
| 5,200,831 | 4/1993 | Tai | 358/298 |
| 5,204,753 | 4/1993 | Tai | 358/298 |
| 5,258,849 | 11/1993 | Tai et al. | 358/298 |
| 5,258,850 | 11/1993 | Tai | 358/298 |
| 5,260,807 | 11/1993 | Tai | 358/456 |
| 5,274,472 | 12/1993 | Williams | 358/455 |
| 5,289,294 | 2/1994 | Fujisawa | 358/461 |
| 5,291,311 | 3/1994 | Miller | 358/456 |
| 5,333,260 | 7/1994 | Ulichney | 395/162 |
| 5,333,262 | 7/1994 | Ulichney | 395/164 |
| 5,359,431 | 10/1994 | Ng | 358/457 |
| 5,444,551 | 8/1995 | Miller et al. | 358/456 |
| 5,455,681 | 10/1995 | Ng | 358/298 |
| 5,469,516 | 11/1995 | Kerz | 358/456 |
| 5,488,487 | 1/1996 | Ojima et al. | 358/456 |
| 5,495,345 | 2/1996 | Ulichney | 358/457 |
| 5,542,029 | 7/1996 | Karlsson | 358/456 |
| 5,555,102 | 9/1996 | Dalton | 358/456 |

OTHER PUBLICATIONS

*Xerox Disclosure Journal*; "A Partial Dot Algorithm For Multi–Level Pixel Halftone Cells"; vol. 14 No. 4 Jul./Aug. 1989, pp. 175–176; Thomas Henderson et al.

J. C. Stoffel; "A Survey of Electronic Techniques for Pictorial Image Reproduction"; IEEE Transactions on Communications, vol. COM–29.12, Dec. 1991.

Paul A. Delabastita; "Multilevel Halftoning"; Is & T's Fourth Technical Symposium on Prepress, Proofing & Printing (1995).

P. Pirsch; A. N. Netravali; "Transmission of Gray Level Images by Multilevel Dither Techniques"; pp. 31–44.

*Primary Examiner*—Scott A. Rogers
*Assistant Examiner*—Fan Lee
*Attorney, Agent, or Firm*—Duane C. Basch

[57] ABSTRACT

The present invention is a method and apparatus for generating N-bit per pixel output signals in response to M-bit per pixel image input signals, where M is greater than N. The invention employs a halftone cell threshold memory that stores a single threshold for each cell element. During real-time processing of the video image signals, multiple thresholds are calculated based upon the stored thresholds, and the image signals are compared to the thresholds. The threshold calculation process is simplified by using equally spaced constants and any desired variation from the resulting equally spaced thresholds is accomplished through a remapping of the video image signals using a look-up table. The output of the plurality of comparisons carried out for each halftone cell element is then encoded to produce a digital gray-scale output signal.

20 Claims, 6 Drawing Sheets

METHOD AND APPARATUS FOR GRAY SCREENING

This invention relates generally to an apparatus and method for gray screening, and more particularly to an apparatus and method for generating N-bit per pixel output signals in response to M-bit per pixel image input signals, where M is greater than N.

BACKGROUND AND SUMMARY OF THE INVENTION

The present invention is a method and an apparatus suitable for gray screening to produce a plurality of multi-bit, halftoned output signals for rendition by a printing device in response to multi-bit image signals. The present invention is a method and apparatus for efficiently accomplishing the gray screening process and for enabling the use of overlapping thresholds so that the growth of the halftone dot may be accomplished using partial pixel exposure. It is believed that the present invention, therefore, results in a reduced implementation cost and allows faster processing speeds. Moreover, the processing of a multi-bit image in accordance with the present invention will reduce objectionable banding often found in halftoning processes that can only operate on (e.g., grow) a single halftone element at one time.

Heretofore, a number of patents and publications have disclosed screening or error diffusion processes by which gray or high-addressability binary outputs are generated, the relevant portions of which may be briefly summarized as follows:

As described by T. Henderson et al. in the *Xerox Disclosure Journal*, Vol. 14, No. 4, pp. 175–76, hereby incorporated by reference, a look-up table may be employed to accomplish a gray halftoning operation to convert images recorded at 8-bits (256 levels) per pixel to halftone representations suitable for printing on devices capable of rendering 2-bit pixels.

U.S. Pat. No. 5,444,551 to Miller et al. discloses an apparatus and method for generating a multi-level halftone image from a digitally sampled continuous tone image. The control circuit is employed in conjunction with a preference matrix having a plurality of look-up tables in the form of a look-up table stack. Each look-up table contains a one-dimensional transfer function, where the sum of the derivatives of the transfer function equal the number of pixel values in the halftone cell.

U.S. Pat. No. 5,455,681 to Ng teaches a method of printing with a grey level printhead image data that was received in a high-resolution binary format and converted in a blockwise manner to produce gray level pixel data.

U.S. Pat. No. 5,274,472 to Williams, hereby incorporated by reference, discloses a high addressability image generator to convert gray level image data into high-addresssability data for printing by an image output terminal.

U.S. Pat. No. 4,544,264 and U.S. Pat. No. 4,625,222 to Bassetti et al., disclose enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

James C. Stoffel et al. in *A Survey of Electronic Techniques for Pictorial Image Reproduction*, IEEE Transactions on Communications, Vol. COM-29, No. 12, December 1981 discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

Paul A. Delabastita in *Multilevel Halftoning*, IS&T 4th Technical Symposium on Prepress, Proofing & Printing, pp. 68–73 (October 1995), summarizes a number of schemes to perform multilevel halftoning.

P. Pirsch et al. teach, in *Transmission of Gray Level Images by Multilevel Dither Techniques*, Computers & Graphics, Vol. 7, No. 1, pp. 31–44 (1983) the extension of dither to multilevels. Described therein is a procedure for deriving thresholds for a multilevel dither and a procedure for reconstructing a gray level image from a dithered image.

As is known in the generation of binary halftone (dithered) images, an array of threshold values may be be employed in a regularly shaped "halftone cell" (usually rectangular) that is applied repeatedly across an entire image or segment thereof. If the size of the halftone cell is p×q pixels, then the halftone screen can generate p×q levels of gray for the cell, assuming only one threshold value per pixel position (element) within the cell. In a printing system that can render gray pixels, either via amplitude modulation or pulse width modulation of the exposure mechanism, it is conceivable that a gray screen may be employed to convert continuous tone input into gray halftones for printing. Here, the gray screen is accomplished in a manner similar to that described with respect to binary halftone screens, except that multiple threshold values must be determined for each of the pixel positions or elements within the halftone cell. Furthermore, the result of a comparison of an input video signal level with the multiple threshold values is no longer a single binary signal but a multi-bit signal indicating the gray level to be output or rendered by the printing device. As an example, if an input video signal is compared against three thresholds, the resulting output is a 2-bit number having one of four possible states. As described herein, these possible states are white (W), light gray (G1), dark gray (G2) and black (B).

The advantage of printing in gray is that it is possible to obtain more gradations (gray levels) over the cell than is possible for a binary halftone cell of the same size. However, it will be recognized that one drawback of gray halftone processing is the requirement for storage of multiple thresholds for each position in the halftone cell. This storage requirement becomes more important as larger screens are developed.

In accordance with the present invention, there is provided a system for processing a bitmap image consisting of a plurality of multi-bit image signals representing pixels in the bitmap image, comprising:

a halftone cell address generation circuit, said circuit generating an address, on a pixel-by-pixel basis, indicative of the relative position of a pixel within the halftone cell;

means for generating a plurality of thresholds for each pixel position within the halftone cell, said generating means being responsive to the address generated by the halftone cell address generation circuit and outputting one of the unique threshold values in response thereto;

means for comparing at least two of the plurality of thresholds associated with the relative position of the pixel within the halftone cell to a multi-bit image signal for the pixel; and output means, responsive to the results of said comparing means, for outputting a code indicative of the results.

In accordance with another aspect of the present invention, there is provided a multifunctional system having an image processing apparatus for processing a bitmap image consisting of a plurality of image signals, comprising:

a halftone cell address generation circuit, said circuit generating an address, on a pixel-by-pixel basis, wherein the address is indicative of the relative position of a pixel within the halftone cell;

threshold memory, connected to receive the address generated by said halftone cell address generation circuit, for producing a first threshold value in response to the address;

at least two adders, connected to said look-up table, for adding predetermined values to the first threshold value to produce a plurality of additional threshold values;

a comparator circuit for comparing the first and each of the plurality of additional thresholds associated with the relative position of the pixel within the halftone cell to a multi-bit image signal for the pixel, said comparator circuit producing a binary value for each of the comparisons; and an output encoder, responsive to the binary values produced by said comparator circuit, for outputting a gray-scale digital code indicative of the output level of the pixel.

In accordance with yet another aspect of the present invention, there is provided a method for processing a bitmap image consisting of a plurality of image signals to produce a multi-bit halftone image, comprising:

generating a plurality of unique threshold values, one for each possible pixel position within a halftone cell;

storing the plurality of unique threshold values in threshold memory;

generating an address indicative of the relative position of a pixel within a halftone cell;

selecting, in response to the address, a first unique threshold value from the plurality of unique threshold values stored in the threshold memory;

comparing the first unique threshold value with the pixel image signal level;

calculating, in response to the first unique threshold value, a second unique threshold value;

comparing the second unique threshold value with the pixel image signal level; and outputting a code indicative of the results of at least the above comparing steps.

One aspect of the invention is based on the observation of problems with conventional printing systems. Such systems, although they may be capable of rendering gray images, either do not employ gray halftones or, if employed, require considerable memory for the storage of threshold data to accomplish the gray halftone. However, such systems may result in user dissatisfaction because of cost, slower processing speeds, or unacceptable output. A further aspect of the present invention is based upon the observation of objectionable output that arises when a gray level printing system requires non-overlapping halftone dots (where only a single gray dot may be produced within a halftone cell at any time).

This aspect is based on the discovery of a technique that alleviates these problems by improving the manner in which halftone cell thresholds are stored and generated during use, and by enabling overlap between thresholds for different halftone cells. This technique can be implemented, for example, by circuitry that efficiently employs memory for storage of only a single threshold while calculating the remaining thresholds in real-time. A machine implementing the invention can include a laser-based electronic printing system, wherein the laser beam intensity or exposure level may be modified via pulse width position modulation (PWPM) in response to the signals representing the gray level output signals (code) generated by the halftone method or apparatus.

Figure 1:
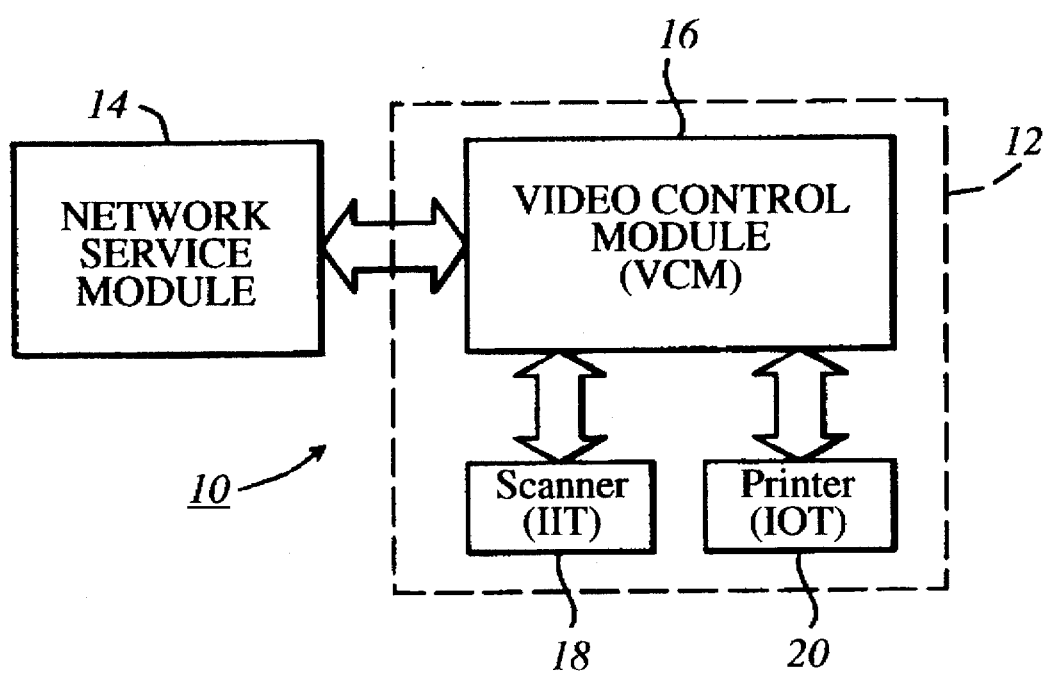
FIG. 1 is a block diagram depicting a multifunctional, network adaptive printing machine.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information (e.g., image data). When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." An n-bit item of data has one of $2^n$ values. A "multi-bit" item of data is an item of data that includes more than one bit. The term "data" includes data existing in any physical form, and includes data that are transitory or are being stored or transmitted. For example, data could exist as electromagnetic or other transmitted signals or as signals stored in electronic, magnetic, or other form. An item of data "defines" an image when the item of data includes sufficient information to produce the image. For example, a two-dimensional array can define all or any part of an image, with each item of data in the array providing a value indicating the color of a respective location of the image. A "raster" is a one-dimensional array of image data, reflecting a single line of data across a single dimension (length or width) of the image.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image. A "neighborhood operation" is an image processing operation that uses data relating to one part of an image to obtain data relating to another part of an image.

A segment of an image is adjacent to another segment of the image "along an edge" if the two adjacent segments meet at the edge and do not overlap. Pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

The term "resolution reconstruction" represents a decoding operation performed on data defining an image, where an encoded signal representing a single partially exposed pixel and its neighbors is decoded to determine the placement of the partial-pixel exposure signal within a pixel boundary in order to accurately reproduce the image in an output print. Accurate reproduction, in this context, is understood to mean as similar as possible to the representation before the encoding.

An "image characteristic" or "characteristic" is a measurable attribute of an image. An operation can "measure" a characteristic by producing data indicating the characteristic using data defining an image. A characteristic is measured "for an image" if the characteristic is measured in a manner that is likely to produce approximately the same result each time it occurs.

"Circuitry" or a "circuit" is any physical arrangement of matter that can respond to a first signal at one location or time by providing a second signal at another location or time. Circuitry specifically includes logic circuits existing as interconnected components, programmable logic arrays (PLAs) and application specific integrated circuits (ASICs). Circuitry "stores" a first signal when it receives the first signal at one time and, in response, provides substantially the same signal at another time. Circuitry "transfers" a first signal when it receives the first signal at a first location and, in response, provides substantially the same signal at a second location.

"Memory circuitry" or "memory" is any circuitry that can store data, and may include local and remote memory and input/output devices. Examples include semiconductor ROMs, RAMs, and storage medium devices with data storage media that they can access. A "memory cell" is memory circuitry that can store a single unit of data, such as a bit or other n-ary digit or an analog value.

An "image input terminal" (IIT) or "image input device" is a device that can receive an image and provide an item of data defining the image. A "scanner" is an image input device that receives an image by a scanning operation, such as by scanning a document.

An "image output terminal" (IOT) or "image output device" is a device that can receive an item of data defining an image and provide the image as output. A "display" is an image output device that provides the output image in human viewable form. The visible pattern presented by a display is a "displayed image" or simply "image." Printers or printing systems are other examples of image output terminals.

Referring now to FIG. 1, a multifunctional, network adaptive printing system is designated by reference numeral 10. The printing system 10 includes a printing machine 12 operatively coupled with a network service module 14. The printing machine 12 includes an electronic subsystem 16, referred to as a video control module (VCM), communicating with a scanner 18 and a printer 20. In one example the VCM 16, which will be described in further detail below, coordinates the operation of the scanner (IIT) and printer (IOT) in a digital copying arrangement. In such an arrangement the scanner 18 "reads" or rasterizes an image on an original document using, for example, a charge coupled device (CCD) array, and converts analog video signals produced by the CCD into digital signals. In turn, an image processing system, blocks 22 and 23 of FIG. 2, associated with scanner 18 executes signal correction and the like, converts the corrected signals into multi-level signals (e.g. binary signals), compresses the multi-level signals and preferably stores the same in electronic pre-collation (EPC) memory 24.

Referring again to FIG. 1, the printer (IOT) 20 preferably includes a xerographic print engine. In one example, the print engine has a multi-pitch photoreceptor belt (not shown) exposed with an imaging source, such as a laser raster output scanning device or a light-emitting diode (LED) print bar. In a printing context, the multi-level image data is read out of the electronic pre-collation (EPC) memory 24 (FIG. 2) while the imaging source is turned on and off, in accordance with the image signals or data, forming a latent image on the photoreceptor. In turn, the latent image is developed with a development technique and transferred to a print media sheet. Upon fusing the resulting print it may be inverted for duplexing in the printing system or simply output therefrom. It will be appreciated by those skilled in the art that the printer can assume other forms besides a xerographic print engine (e.g., thermal ink jet or ionographic) without altering the concept upon which the disclosed embodiment is based.

Figure 2:
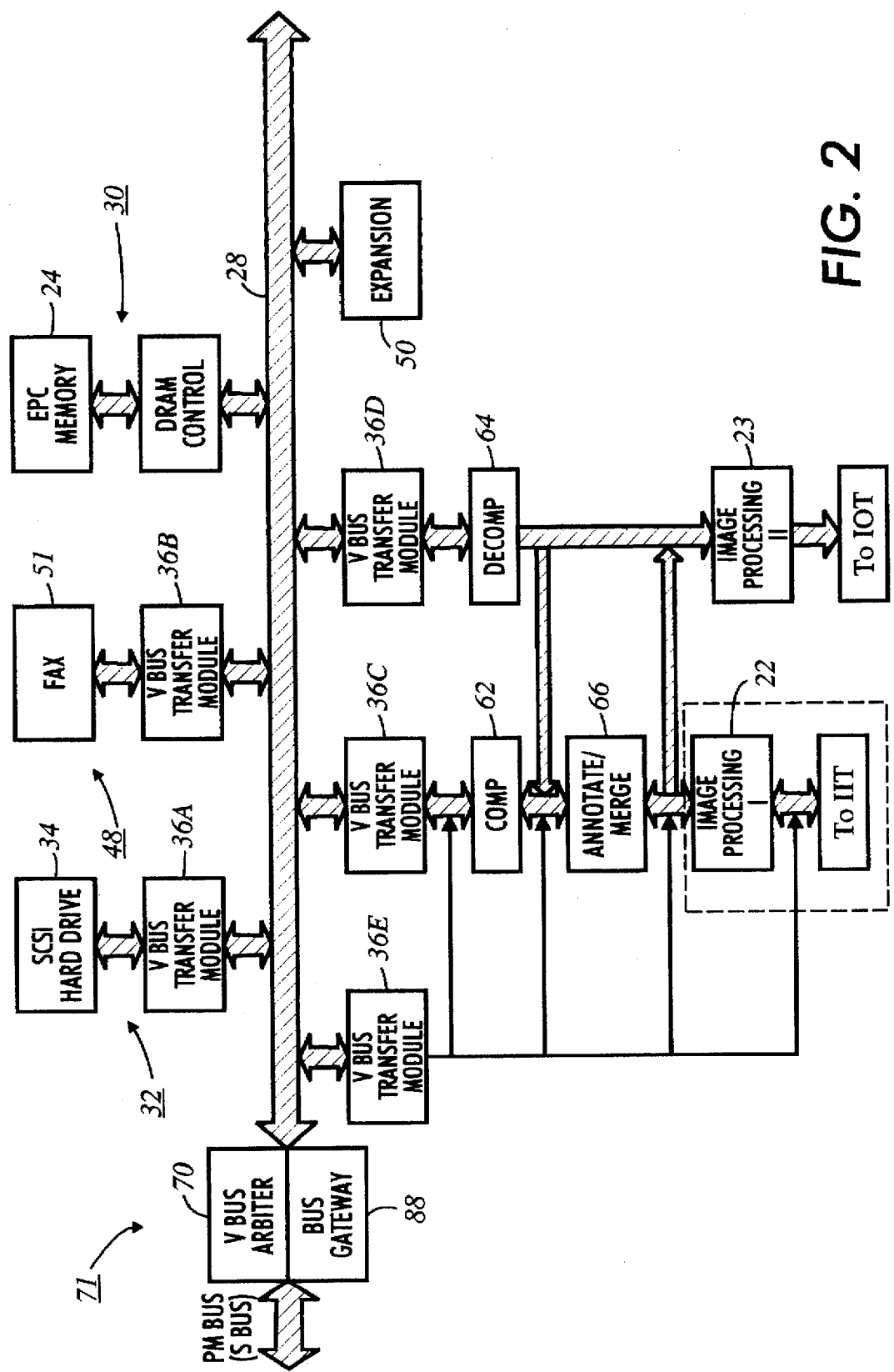
FIG. 2 is a block diagram of a video control module for the printing machine of FIG. 1.

Referring specifically to FIG. 2, the VCM 16 is discussed in further detail. The VCM 16 includes a video bus (VBus) 28 with which various I/O, data transfer and storage components communicate. Preferably, VBus 28 is a high speed, 32-bit data burst transfer bus, expandable to 64-bits. The 32-bit implementation has a sustainable maximum bandwidth of approximately 60 MBytes/sec., and a burst bandwidth as high as 100 MBytes/sec.

The storage components of the VCM reside in the EPC memory section 30 and the mass memory section 32. The EPC memory section includes the EPC memory 24, the EPC memory being coupled with the VBus by way of a DRAM controller 33. The EPC memory, which is preferably DRAM, provides expansion of up to 64 MBytes, by way of two high density 32-bit SIMM modules. The mass memory section 32 includes a SCSI hard drive device 34 coupled to the VBus by way of a transfer module 36a. As will appear, other I/O and processing components are coupled respectively to the VBus by way of transfer modules 36. It will be appreciated that other devices (e.g. a workstation) could be coupled to the VBus by way of transfer module 36a through the use of a suitable interface.

Referring to FIGS. 1 and 2, three I/O components are shown as being coupled operatively to VBus 28, namely a FAX module 48, the scanner or IIT 18, and the printer or IOT 20. It should be recognized, however, that a wide variety of components could be coupled to the VBus by way of an expansion slot 50.

Referring again to FIG. 2, the IIT 18 and IOT 20 are operatively coupled to the VBus 28 by transfer modules 36c and 36d. Additionally, the IIT 18 and the IOT 20 are operatively coupled with a compressor 62 and a decompressor 64, respectively. The compressor and decompressor are preferably provided by way of a single module that employs Xerox adaptive compression or other commercially available lossless devices. Xerox adaptive compression devices have been used for compression/decompression operations by Xerox Corporation in its DocuTech® printing system.

The scanner 18, which includes the image processing section 22, is coupled with an annotate/merge module 66. Preferably the image processing section includes one or more dedicated processors programmed to perform various desired functions, such as image enhancement, thresholding/screening, rotation, resolution conversion and TRC adjustment. The selective activation of each of these functions can be coordinated by a group of image processing control registers, the registers being programmed by a system controller. Preferably, the functions are arranged along a "pipeline" in which image data is input to one "end" of the pipe, and processed image data is output from the other "end."

Referring still to FIG. 2, arbitration of the various bus masters of the VCM 16 is implemented by way of a VBus arbiter 70 disposed in a VBus arbiter/bus gateway 71. The arbiter determines which bus master (e.g. FAX module, Scanner, Printer, SCSI Hard Drive, EPC Memory or Network Service Component) can access the VBus at one given time.

As illustrated by the embodiment of FIG. 2, input image data from an IIT may be input to image processing section 22. In one mode of operation, the input image data is obtained by scanning or rasterizing a document to produce x bits of gray data in the form of a bit stream for each pixel position. In turn, the gray data is thresholded so that an image pixel is expressed as an n-bit image signal where n is less than x. In one example, the given input image (gray data) is processed at 600×600×3 spi so that n=3 and a resulting output, with a resolution of 1800×600×1 spi (high addressability), can be obtained. It has been found, however, that storage can be optimized and a high addressability output resolution of 1800×600×1 spi obtained even when the value of n is less than 3. As will appear, the present technique is applicable for inputs and outputs of various resolutions, and image data can be obtained from a wide range of input sources without affecting the concept underlying the disclosed embodiment.

In accordance with the technique described by T. Yeh et al. in U.S. patent application Ser. No. 08/315,275, incorporated herein by reference, image data is encoded so that n bits are described with n-m bits where each m-bit signal represents positional information (e.g., subpixel position within a pixel period) while the n-bit signals represent intensity information (gray level). In other words, three bits of "gray" image data (e.g., 600×600×3) are encoded or characterized for output with two bits (e.g., one of four levels; 600×600×2).

It is to be understood that high addressability output devices, IOTs, may be employed to produce "gray" output using subpixel addressing. More specifically, a 2-bit/pixel output image may be produced using a pixel addressing scheme where each pixel is output as a series of two subpixels, where the order and on/off state of the subpixels results in a "gray" output when considered on a pixel-by-pixel basis. However, the higher addressability feature typically results in more image data in order to render "gray" output.

As examples, a 600×600×2 spi pixel, with an intensity of 00/b (where "/b" signifies a binary number), is equivalent to three white pixels at 1800×600×1 output, a 600×600×2 spi pixel, with an intensity of 01/b, is equivalent to one black pixel and two white pixels, at 1800×600×1 spi, and so on. Nonetheless certain image-related information is lost by such an encoding scheme because gray pixels represented by the 3-bit image signals (600×3) cannot be fully described by just two bits. In other words, use of only two bits does not indicate whether the black pixel was left justified, right justified or center justified. However, this missing or lost information can be provided via a reconstruction step or process as described by T. Yeh et al.

Referring again to FIG. 2 an encoded bit stream is compressed, with compressor 62 and stored in EPC memory 24. The compressed data is then held in EPC memory until it is copied to disk 34 or output to an appropriate output device, such as the printer (IOT) 20 via image processing block 23. When it is time to output the stored data decompression is effected with decompressor 64. As will be appreciated from the discussion above, movement of data between the image processing sections, compressor, EPC memory and the decompressor, is facilitated with the transfer modules 36.

Figure 3:
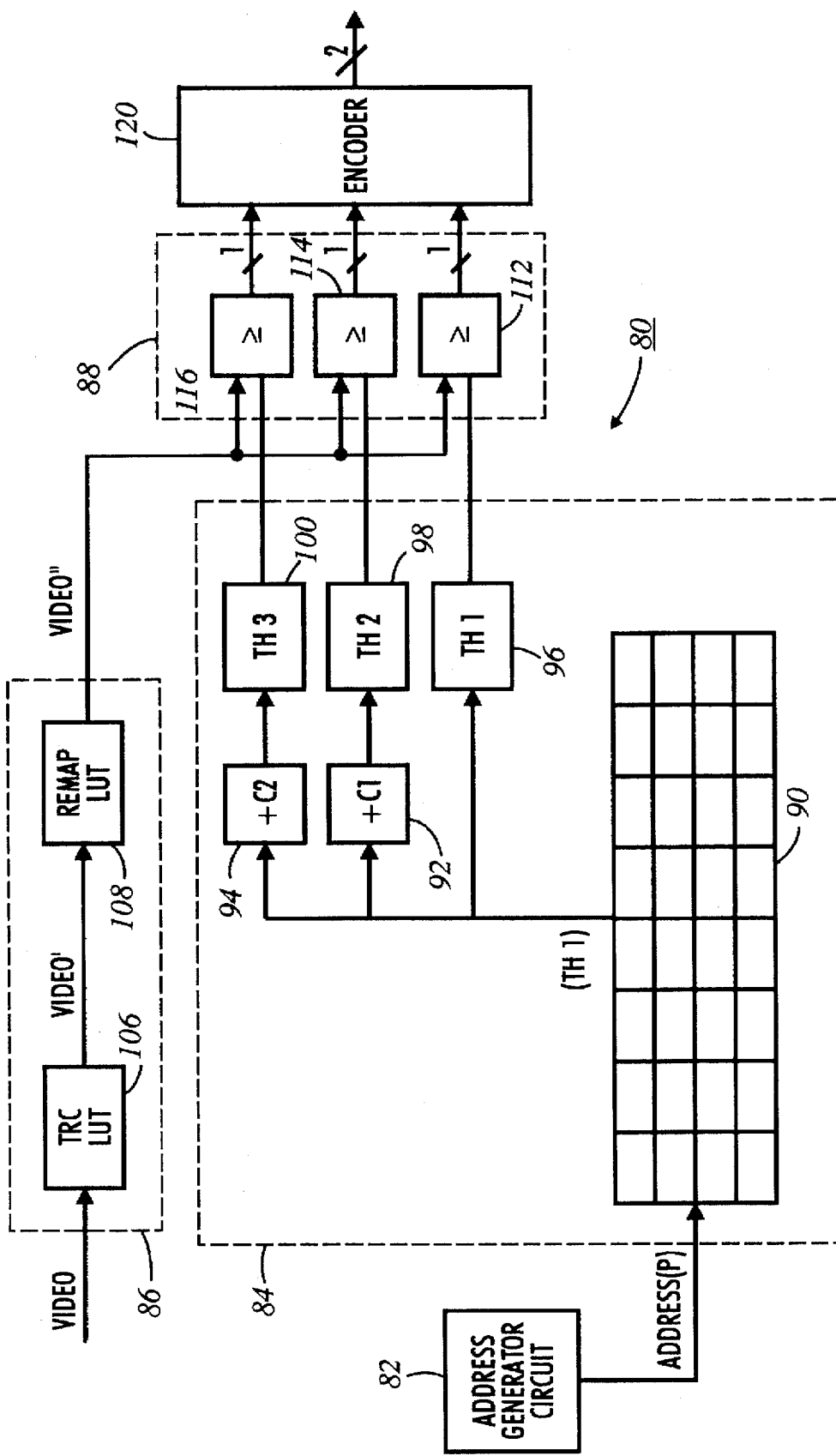
FIG. 3 is a schematic block diagram depicting various components of an embodiment for accomplishing the gray halftoning operations in accordance with the present invention.

In anticipation of outputting the image data, the corresponding bit stream is processed to produce halftone gray output signals with a circuit 80 as represented in a simplified manner by the schematic drawing of FIG. 3. Circuit 80 is preferably implemented as an ASIC or similar large scale integrated circuit which may include additional logic functionality thereon. Alternatively, the image processing operations described herein may be performed on a programmable computer, data processor or image processing system. In the preferred embodiment, the dual-function circuit 80 is located within an ASIC in the VCM 16 of FIG. 1, but may also be placed in-line at any location between decompression block 64 of FIG. 2 and the IOT. The halftoning circuit 80 comprises four functional blocks; address generation circuit 82, halftone threshold generation means 84, video correction means 86 and threshold comparison means 88. Functionally, circuit 80 may receive rasterized image signals in a 600×600×8 format from an EPC image buffer 24 which may be any of the previously described memory devices, and processes the image signals so as to produce halftone output suitable, with additional processing, for driving a pulse-width, position-modulated raster output scanner (IOT).

More specifically, address generation circuit 82 is preferably a series of modulo counters, for raster pixel counts that is clocked on a pixel-by-pixel basis to identify the position within the halftone cell with which a particular pixel is associated. As a simple example, in a p×q halftone cell (p columns and q rows) signal $S_{(i,j)}$ will be associated and processed in accordance with halftone cell position $P_{(i\ mod\ p,\ j\ mod\ q)}$. Hence, address generation circuit 82 outputs the address P on a pixel-by-pixel basis to indicate or select a halftone cell location.

Figure 5:
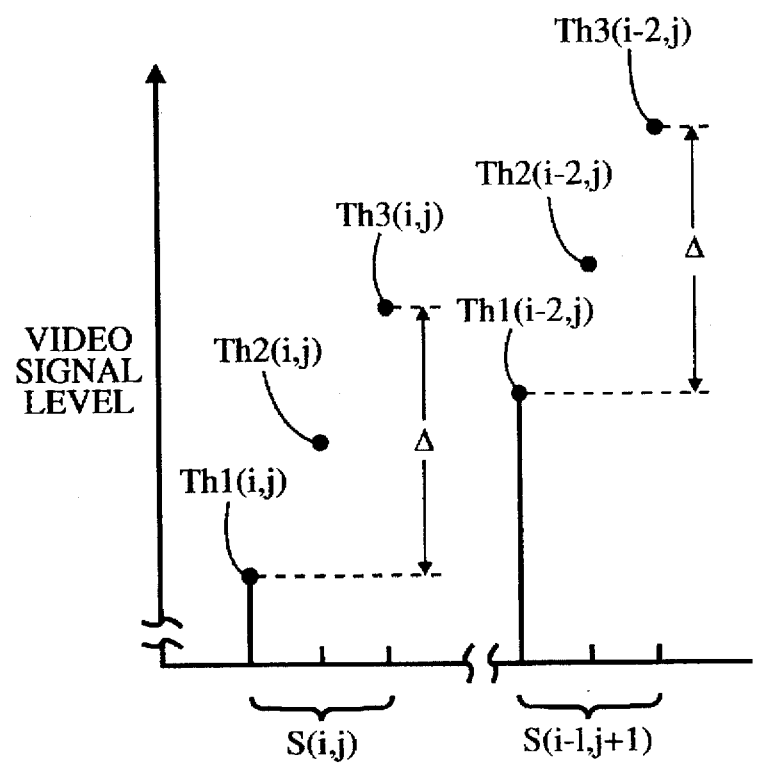
Figure 6:
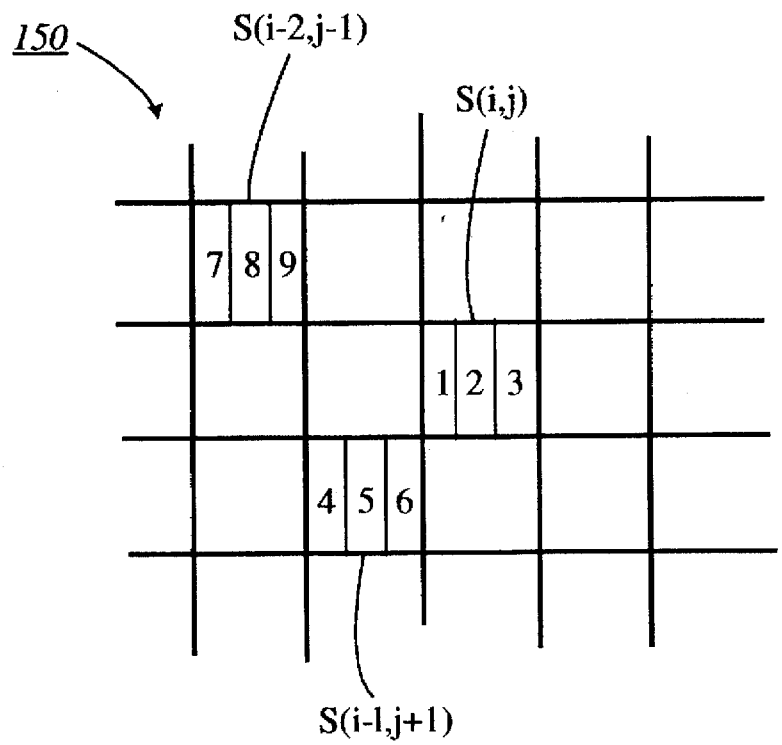
FIGS. 6 and 7 respectively illustrate exemplary high-addressability pixels as they would be filled in in accordance with the schemes depicted in FIGS. 4 and 5.
Figure 7:
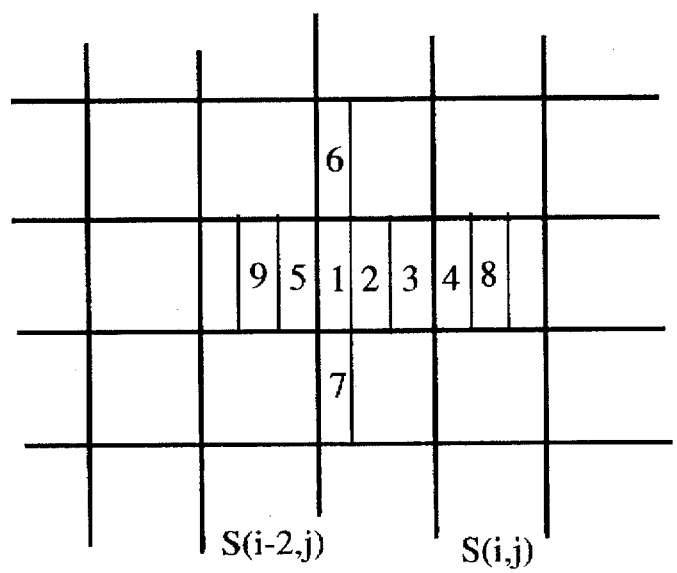

Continuing with FIG. 3, once the address is generated by circuit 82, the halftone threshold generation means is employed to produce a plurality of halftone levels or values. In a preferred embodiment, the threshold generation means includes a threshold look-up table (LUT) 90, a plurality of addition blocks 92 and 94, and latches 96, 98 and 100. In operation, LUT 90 outputs a threshold value signal Th1 in response to the address P. The signal Th1 is then supplied to addition blocks 92 and 94, where the signal is added to constants C1 and C2, respectively, to produce threshold Th2 and Th3, respectively. Subsequently, the three threshold value signals are stored in the latches 96, 98 and 100 as illustrated. In one embodiment, the values associated with constants C1 and C2 may be integer multiples of one another. Alternatively, the values represented by the constants may be unrelated to one another. As will be described subsequently with respect to FIGS. 4–7, the resulting threshold values may either be non-overlapping (FIGS. 4 and 6) or overlapping (FIGS. 5 and 7).

Figure 8:
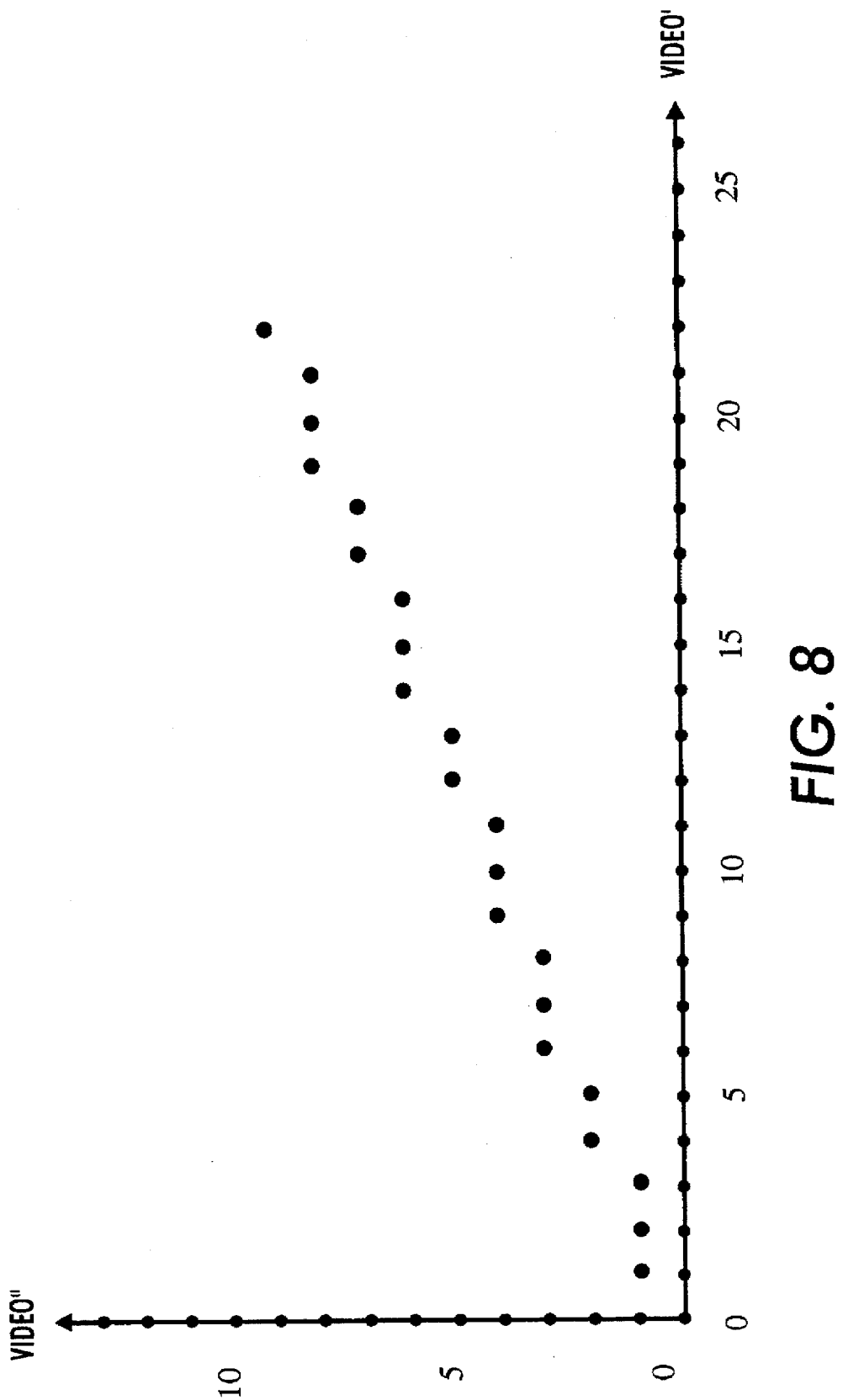
FIG. 8 is a graphical representation of an exemplary remapping of the video signals in accordance with one aspect of the present invention.

Concurrent with generation of the thresholds, the multi-bit video signal input to video correction means 86 is being corrected. In one embodiment, the TRC correction is accomplished using a TRC LUT 106, and a remapping of the video is accomplished using Remapping LUT 108. The functionality of Remapping LUT 108 is employed for the gray screening operation in the preferred embodiment where threshold constants C1 and C2 represent equal increments. The equal increments simplify the hardware by eliminating what may be a need for unequal increments, where the inequality in variance between successive threshold pairs Th1–Th2 and Th2–Th3 is achieved by modification (remapping) the TRC corrected video signal (video') as illustrated in FIG. 8. As an example, the following table (Table A) shows the remapping results for a certain halftone cell position and various corrected video signal levels (video'): It will be further appreciated by those skilled in the art of digital image processing that the functionality of the TRC LUT 106 and Remapping LUT 108 may be combined in a common LUT or similar video correction means so that the input video signals (video) are transformed to the desired output signals (video'').

As further illustrated in FIG. 3, the transformed video signals (video'') are then compared to each of the possible threshold levels (Th1, Th2, and Th3) in threshold comparison means 88. In a preferred embodiment, the comparison is accomplished by a plurality of parallel comparators, 112, 114 and 116, the output of which is a binary "0" if the video'' signal is less than the threshold signal level and a binary "1" if greater than or equal to the threshold signal level. After comparison, there exists a 3-bit binary value, wherein each bit represents the outcome of one of the comparison operations. As illustrated in FIG. 3, the 3-bit result is passed to an encoder 120 where the 3-bit value is encoded to represent a 2-bit gray halftone value. The encoding process is accomplished in accordance with the following logic table, Table B:

where "X" represent a "don't care" value that does not impact the output.

TABLE A

| Thresholds = 1, 4 & 6 | | | Equally Spaced | | |
| TRC corrected video' | Output | | Thresholds = 1, 2 & 3 | | |
| | 6/4/1 | Gray | remapped video'' | Output 3/2/1 | Gray |
| --- | --- | --- | --- | --- | --- |
| 0 | 000 | 0 | 0 | 000 | 0 |
| 1 | 001 | 1 | 1 | 001 | 1 |
| 2 | 001 | 1 | 1 | 001 | 1 |
| 3 | 001 | 1 | 1 | 001 | 1 |
| 4 | 011 | 2 | 2 | 011 | 2 |
| 5 | 011 | 2 | 2 | 011 | 2 |
| 6 | 111 | 3 | 3 | 111 | 3 |
| 7 | 111 | 3 | 3 | 111 | 3 |
| 8 | 111 | 3 | 3 | 111 | 3 |
| 9 | 111 | 3 | 4 | 111 | 3 |

TABLE B

| Comparator Output | | | Gray Halftone Output | |
| --- | --- | --- | --- | --- |
| 116 | 114 | 112 | MSB | LSB |
| 0 | 0 | 0 | 0 | 0 |
| 0 | 0 | 1 | 0 | 1 |
| 0 | 1 | X | 1 | 0 |
| 1 | X | X | 1 | 1 |

Figure 4:
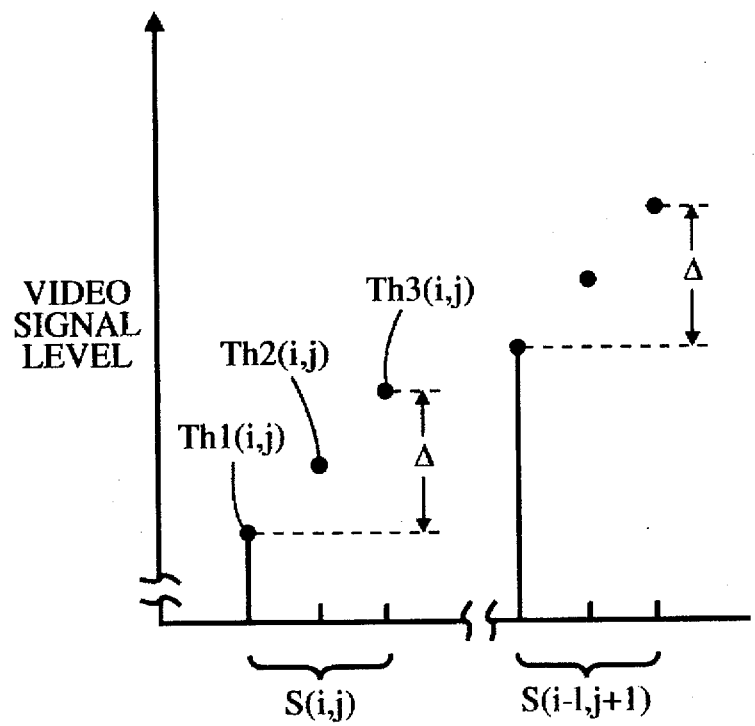
FIGS. 4 and 5 respectively illustrate graphical representations of the non-overlapping and overlapping threshold levels that are an aspect of the present invention.

Referring now to FIG. 4, displayed therein is a graphical representation of a non-overlapping threshold scheme. With the video signal level shown along the vertical axis, the horizontal axis represents the pixel position or element within the halftone cell, S(i,j). As has been described with respect to the 2-bit per pixel embodiment, three thresholds are used to determine the output. For example, for position S(i,j), thresholds Th1(i,j), Th2(i,j) and Th3(i,j) are used. As has been described, the embodiment preferably employs equally spaced thresholds for comparison, while altering the video signal using the remap LUT 108 in FIG. 2. Accordingly, the three thresholds define and equally divide the video signal range (Δ) into two equal segments as illustrated. As the video signal level increases for the pixel corresponding to halftone cell position S(i,j), the exposure pulse for the cell would "grow" or lengthen upon reaching the next threshold. Moreover, there would be no exposure of a subsequent halftone element, for example S(i,j+1), until S(i,j) was completely filled. This single-element growth is illustrated in FIG. 6, where the order of additional exposure for halftone cell 150 is illustrated by the numerals in the partial pixel positions, three for each halftone cell element. Referring to FIG. 6, it is shown that cell position S(i,j) is filled to completion (1–3) before cell position S(i–1,j+1) begins to be exposed (4–6), and similarly for position S(i–2,j–1) having respective threshold levels 7–9.

Referring to FIGS. 5 and 7, in contrast, it can be seen that overlapping thresholds leads to a completely different fill-in scheme. It will be appreciated that the previously described TRC remapping function (LUT 108) would need to be optimized for rendering the output with overlapping thresholds. Specifically, FIG. 5 Shows that before the video level for pixel S(i,j) reaches the third threshold level (Th3(i,j)), exposure for another cell position, S(i–2,j), begins so that the dot for position S(i,j–1) grows in each direction. In other words, as seen in FIG. 7, the exposure level for the halftone cell elements continues to proceed from white - gray1 - gray2 - black, but the progression does not happen at a complete cell position before other cell positions are exposed as was the case in FIG. 6. Rather, using the overlapping thresholds, for example thresholds Th1(i−2,j) and Th3(i,j), there is progressive growth over a number of cell positions. This results in a halftone dot that is smoother in its outline and leads to the rendition of gray-scale video signals without steps or contrast discontinuities typically found in the non-overlapping method illustrated in FIGS. 4 and 6.

In recapitulation, the present invention is a method and apparatus for generating N-bit per pixel output signals in response to M-bit per pixel image input signals, where M is greater than N. The invention employs a halftone cell threshold memory that stores a single threshold for each cell element. During real-time processing of the video image signals, multiple thresholds are calculated based upon the stored thresholds, and the image signals are compared to the thresholds. The threshold calculation process is simplified by using equally spaced constants and any desired variation from the resulting equally spaced thresholds is accomplished through a remapping of the video image signals using a look-up table. The output of the plurality of comparisons carried out for each halftone cell element is then encoded to produce a digital gray-scale output signal.

It is, therefore, apparent that there has been provided, in accordance with the present invention, an apparatus for gray screening. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. A system for processing a bitmap image consisting of a plurality of multi-bit image signals representing pixels in the bitmap image, comprising:

a halftone cell address generation circuit, said circuit generating an address, on a pixel-by-pixel basis, indicative of the relative position of a pixel within the halftone cell;

means for generating a plurality of thresholds for each pixel position within the halftone cell, said generating means being responsive to the address generated by the halftone cell address generation circuit and outputting one of the unique threshold values in response thereto;

means for comparing at least two of the plurality of thresholds associated with the relative position of the pixel within the halftone cell to a single multi-bit image signal for the pixel; and output means, responsive to the results of said comparing means, for outputting a multi-bit gray-scale code indicative of the results.

2. The system of claim 1, wherein the multi-bit image signals consist of M bits and the code consists of N bits and where M is greater than N which is greater than 1.

3. The system of claim 1, wherein said means for generating a plurality of thresholds comprises:

a look-up table, connected to receive the address generated by said halftone cell address generation circuit, for outputting a first unique threshold value in response to the address; and an adder, connected to said look-up table, for adding a predetermined value to the first unique threshold value output by said look-up table to produce a second unique threshold value.

4. The system of claim 3, wherein said threshold generating means further comprises a second adder, connected to said look-up table, for adding a second predetermined value output by said look-up table to the first unique threshold value to produce a third unique threshold value.

5. The system of claim 3, wherein said threshold generating means further comprises a latch, connected between said look-up table and said adder, for storing the first unique threshold value.

6. The system of claim 1, wherein said comparing means comprises:

a latch for temporarily storing the multi-bit image signal for the pixel; and a plurality of comparators, one for each unique threshold value, for comparing the multi-bit image signal stored in the latch to the respective unique threshold value to produce a binary output indicative of the result.

7. A system for processing a bitmap image consisting of a plurality of multi-bit image signals representing pixels in the bitmap image, comprising:

a halftone cell address generation circuit, said circuit generating an address, on a pixel-by-pixel basis, indicative of the relative position of a pixel within the halftone cell;

means for generating a plurality of thresholds for each pixel position within the halftone cell, the plurality of thresholds for each pixel position forming a series of increasing signal values, said generating means being responsive to the address generated by the halftone cell address generation circuit and outputting one of the unique threshold values in response thereto, wherein the difference between the signal values for any pair of successive thresholds in the series is equal to the difference between any other pair of successive thresholds in the series;

a look-up table to remap the multi-bit signal for the pixel;

means for comparing at least two of the plurality of thresholds associated with the relative position of the pixel within the halftone cell to a multi-bit image signal for the pixel; and output means, responsive to the results of said comparing means, for outputting a code indicative of the results.

8. The system of claim 7, wherein a first range is defined by a pair of successive thresholds for a first pixel position and a second range is defined by a pair of successive thresholds for a second pixel position, and where the first range and the second range overlap so as to cause output code produced by the system to result in an output having progressive dot growth in the halftone cell over a plurality of pixel positions.

9. A multifunctional system having an image processing apparatus for processing a bitmap image consisting of a plurality of image signals, comprising:

a halftone cell address generation circuit, said circuit generating an address, on a pixel-by-pixel basis, wherein the address is indicative of the relative position of a pixel within the halftone cell;

threshold memory, connected to receive the address generated by said halftone cell address generation circuit, for producing a first threshold value in response to the address;

at least two adders, connected to said threshold memory, for adding predetermined values to the first threshold value to produce a plurality of additional threshold values;

a comparator circuit for comparing the first and each of the plurality of additional thresholds associated with the relative position of the pixel within the halftone cell to a multi-bit image signal for the pixel, said comparator circuit producing a binary value for each of the comparisons; and an output encoder, responsive to the binary values produced by said comparator circuit, for outputting a multi-bit gray-scale digital code indicative of the output level of the pixel.

10. The system of claim 9, wherein the image signals consist of M bits and the output level consists of N bits, and where M is greater than N which is greater than 1.

11. The system of claim 9, wherein said comparator circuit comprises:

a latch for temporarily storing the multi-bit image signal for the pixel; and a plurality of comparators, one for each threshold value, for comparing the multi-bit image signal stored in the latch to the respective threshold value to produce a binary value indicative of the result.

12. The method of claim 11, wherein said step of selecting a first unique threshold value comprises:

receiving the address at a look-up table;

using the address as an index into the look-up table; and outputting the first unique threshold value in response to the index, the first unique threshold value being equal to a value stored in the look-up table at a location corresponding to the index.

13. The method of claim 12, further comprising the steps of:

calculating, in response to the first unique threshold value, a third unique threshold value by adding a second predetermined value to the first unique threshold value; and comparing the third unique threshold value with the pixel image signal level.

14. A multifunctional system having an image processing apparatus for processing a bitmap image consisting of a plurality of image signals, comprising:

a halftone cell address generation circuit, the plurality of thresholds for each pixel position form a series of increasing signal values, said circuit generating an address, on a pixel-by-pixel basis, wherein the address is indicative of the relative position of a pixel within the halftone cell, the difference between the signal values for any pair of successive thresholds in the series is equal to the difference between any other pair of successive thresholds in the series;

a look-up table to remap the multi-bit signal for the pixel;

threshold memory, connected to receive the address generated by said halftone cell address generation circuit, for producing a first threshold value in response to the address;

at least two adders, connected to said look-up table, for adding predetermined values to the first threshold value to produce a plurality of additional threshold values;

a comparator circuit for comparing the first and each of the plurality of additional thresholds associated with the relative position of the pixel within the halftone cell to a multi-bit image signal for the pixel, said comparator circuit producing a binary value for each of the comparisons; and an output encoder, responsive to the binary values produced by said comparator circuit, for outputting a gray-scale digital code indicative of the output level of the pixel.

15. A method for processing a bitmap image consisting of a plurality of image signals to produce a multi-bit halftone image, comprising:

generating a plurality of unique threshold values, one for each possible pixel position within a halftone cell;

storing the plurality of unique threshold values in threshold memory;

generating an address indicative of the relative position of a pixel within a halftone cell;

selecting, in response to the address, a first unique threshold value from the plurality of unique threshold values stored in the threshold memory;

comparing the first unique threshold value with the pixel image signal level;

calculating, in response to the first unique threshold value, a second unique threshold value;

comparing the second unique threshold value with the pixel image signal level; and outputting a multi-bit gray-scale code indicative of the results of at least the first unique threshold and second unique threshold comparing steps.

16. The method of claim 15, wherein the image signals consist of M bits and the code consists of N bits, and where M is greater than N which is greater than 1.

17. The method of claim 15, wherein said step of calculating a second unique threshold value comprises the step of adding a predetermined value to the first unique threshold value output by the look-up table to produce a second unique threshold value.

18. The method of claim 15, wherein said step of comparing the first unique threshold value with the pixel image signal level comprises the steps of:

temporarily storing the pixel image signal in a latch; and comparing, using a plurality of comparators, the multi-bit image signal stored in the latch to the first and the second unique threshold values to produce binary outputs indicative of the result.

19. A method for processing a bitmap image consisting of a plurality of image signals to produce a multi-bit halftone image, comprising:

remapping the pixel image signal;

generating a plurality of unique threshold values, one for each possible pixel position within a halftone cell;

storing the plurality of unique threshold values in threshold memory;

generating an address indicative of the relative position of a pixel within a halftone cell;

selecting, in response to the address, a first unique threshold value from the plurality of unique threshold values stored in the threshold memory;

comparing the first unique threshold value with the pixel image signal level;

calculating, in response to the first unique threshold value, a second unique threshold value;

comparing the second unique threshold value with the pixel image signal level;

calculating, in response to first unique threshold value, a third unique threshold value;

comparing the third unique threshold value with the pixel image signal level, wherein the first, the second and the third unique threshold values for each pixel position form a series of increasing signal values, the difference between each of the increasing signal values for any pair of successive unique thresholds in the series is equal to the difference between any other pair of successive thresholds in the series; and outputting a code indicative of the results of at least the first unique threshold, second unique threshold and third unique threshold comparing steps.

20. The system of claim 19, wherein a first range is defined by a pair of successive thresholds for a first pixel position and a second range is defined by a pair of successive thresholds for a second pixel position, and where the first range and the second range overlap so as to cause the resulting multi-bit halftone image to have progressive dot growth over a plurality of pixel positions in at least one halftone cell.

* * * * *